(12) United States Patent
Rothschild et al.

(10) Patent No.: US 12,026,139 B2
(45) Date of Patent: Jul. 2, 2024

(54) EFFICIENT METHOD TO FIND COLUMNS OF A TABLE WHICH ARE UNIQUE

(71) Applicant: Dell Products L.P., Round Rock, TX (US)

(72) Inventors: Seth Jacob Rothschild, Littleton, MA (US); Brendan Burns Healy, Whitefish Bay, WI (US); Akshaya Khare, Medford, MA (US); Kranti Uppala, Milford, MA (US)

(73) Assignee: DELL PRODUCTS L.P., Round Rock, TX (US)

(*) Notice: Subject to any disclaimer, the term of this patent is extended or adjusted under 35 U.S.C. 154(b) by 61 days.

(21) Appl. No.: 17/806,549

(22) Filed: Jun. 13, 2022

(65) Prior Publication Data

US 2023/0401188 A1 Dec. 14, 2023

(51) Int. Cl.
*G06F 16/22* (2019.01)

(52) U.S. Cl.
CPC ........ *G06F 16/221* (2019.01); *G06F 16/2282* (2019.01)

(58) Field of Classification Search
CPC ... G06F 16/217; G06F 16/221; G06F 16/2282
USPC ....................................................... 707/741
See application file for complete search history.

(56) References Cited

U.S. PATENT DOCUMENTS

| 2007/0282784 A1* | 12/2007 | Modani | ................. | G06F 16/217 |
| 2023/0107632 A1* | 4/2023 | Ogunsemi | ............. | G06F 16/211 |
| | | | | 707/802 |

* cited by examiner

*Primary Examiner* — Hung T Vy
(74) *Attorney, Agent, or Firm* — Workman Nydegger

(57) ABSTRACT

One example method includes identifying a column of a table, and the column includes multiple entries, setting a proposed uniqueness for the column, setting a confidence tolerance for the proposed uniqueness, estimating a sub-sample size for the column based on the proposed uniqueness and the confidence tolerance, based on the sub-sample size, sampling a subset of the entries in the column and, based on the sampling, determining whether or not the column is a primary key for the table.

18 Claims, 4 Drawing Sheets

EFFICIENT METHOD TO FIND COLUMNS OF A TABLE WHICH ARE UNIQUE

FIELD OF THE INVENTION

Embodiments of the present invention generally relate to evaluation of tables, such as may be used in databases. More particularly, at least some example embodiments of the invention relate to systems, hardware, software, computer-readable media, and methods for determining, possibly with a relatively high degree of certainty, whether or not a column of a table is free of duplicate entries.

BACKGROUND

When dealing with a large and complex database, it can be useful to have a column which has a unique element for every entry. For example, such columns may be used to tell a user information about the table, and information about other tables that the table can be linked to. Sometimes no such column exists, so the entries from multiple columns may be combined to construct a column with unique entries out of multiple columns. However, for large tables such as are employed in many applications, this approach can be prohibitively computationally expensive.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
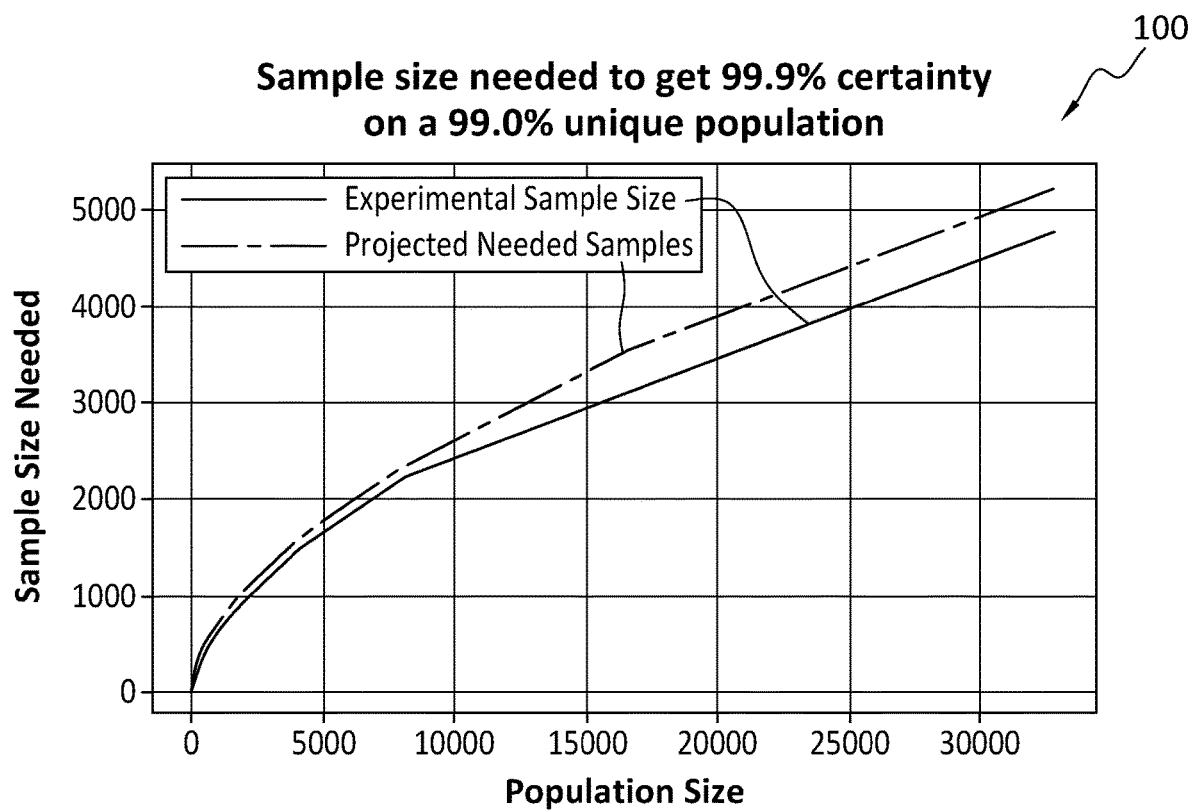
FIG. 1 discloses experimental results obtained by an example embodiment.

Embodiments of the present invention generally relate to evaluation of tables, such as may be used in databases. More particularly, at least some example embodiments of the invention relate to systems, hardware, software, computer-readable media, and methods for determining, possibly with a relatively high degree of certainty, whether or not a column of a table is free of duplicate entries. If the column is determined with relatively high confidence to be free of duplicate entries, the column may thereby provide useful information and insight into aspects of the table, such as the nature and purpose of the table for example.

In general, example embodiments of the invention embrace, among other things, methods to quickly sample potential columns of interest to reduce the computational complexity and time required to find whether a column has no duplicates with high certainty. This method may be applied to any large list of data to provide a level of confidence as to the uniqueness of any list, or lists, in a table.

In more detail, methods according to example embodiments may sample a portion of a list, rather than evaluating all of the items in the list. The sample may provide enough information to support a conclusion that the list does not contain any duplicate entries.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may be able to determine, with relatively high confidence, that a listing of items does not contain any duplicate entries. An embodiment may be able to determine the uniqueness of a listing of items, or entries, by examining only a subset, that is less than all, of the entries in the list. An embodiment may be computationally efficient by examining only a subset of entries of a list. An embodiment may enable determinations to be quickly and efficiently made as to the uniqueness, or not, of a list of items. Various other advantages of example embodiments will be apparent from the present disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

A.1 Context

Consider the following fictional table c sell_stat_transaction_records:

| c_num | c_type | c_color | c_buy id |
|-------|--------|---------|----------|
| 1     | XPS    | White   | 3        |
| 1     | XPS    | Black   | 5        |
| 3     | m15    | Black   | 7        |

A human may be able to guess that this table is about computers, but how might automation be used to improve that guess? In theory, the table or column names might provide good hints but, in practice, the table and column names often appear as in the example above. As can be seen in that example, such table and column names may provide little or no insight as to, for example, the subject of the table.

Thus, a user may be left to use the content of the table to try to determine the subject of the table. One place to start is to check how unique a column is. If it is known that a column has entirely unique entries in this table, that column may be referred to as a 'primary key' and may be used both to learn some information about the table, and to learn about any other places that the column appears in other tables. In the example above, since both c_type and c_color have duplicate entries, namely, 'XPS' and 'Black,' respectively, that content may be assumed, at least initially, to modify the primary object of the table. This means that this table may be assumed, again at least initially, to be either about c_color or about c_buy_id, since those columns do not include any duplicate entries, given the data available in the table.

But if a few more rows are checked, and c_num and c_buy_id are not distinct, it might be necessary to revisit the latter assumption. For example, perhaps the table is really about White XPS versus the Black XPS, that is, a combination of c_type and c_color. To pursue this idea, one or more new, or synthesized, columns may be constructed out of any two of these columns (there are 6 possible ways to do this—that is, given 4 columns, choose any 2 of those columns, sometimes referred to as $$\binom{4}{2} \text{ or } C_2^4,$$

and the new columns then checked to determine if any of them are unique, and could thus act as a descriptor for the table. If none of those work, a new column might be built out of three of the columns, and so forth, until a combination, or combinations, of columns is identified that could act as an acceptable descriptor for the table.

Unfortunately, this column combining approach to determination of a table descriptor scales poorly. To illustrate with an example, if a table has 15 columns with 100 million entries each, even the initial search to determine whether those 15 candidates are primary keys can be time consuming. To check pairs of columns, it would be necessary to check 105 different combinations of columns (15 columns, choose 2, e.g., $$\binom{15}{2} \text{ or } C_2^{15},$$

and checking sets of three columns would require 455 different combinations of columns (15 columns, choose 3, e.g., $$\binom{15}{3} \text{ or } C_3^{15}.$$

Given considerations such as those discussed above, example embodiments may operate to reduce both the complexity of individual uniqueness searches and the scaling of the search for combinations.

A.2 Uniqueness

Example embodiments may be concerned with the uniqueness of a list, such as a list that may appear in a table that includes one or more additional lists, for example. The following discussion is directed to what is meant, in the context of this disclosure, by uniqueness, methods of finding uniqueness, as well as upper and lower bounds on how difficult uniqueness is to detect in a list.

To begin with uniqueness, the uniqueness of a list may be defined as the size of the largest set of non-duplicate elements, in the list, that it is possible to create, divided by the total number of elements. Consider the list:

[0, 1, 2, 3, 4, 5, 6, 7, 8, 9]

This example list has 10 elements and no duplicates, so the uniqueness of this list may be expressed as 10/10, or is 100% unique. A conventional approach to determining uniqueness is to use the memory of the computer and store each value as it is read with a hash table, namely, hash every element and then determine if the system would try to put two hashes in the same place.

Next, consider the following two lists:

[0, 0, 0, 0, 0, 0, 1, 2, 3, 4], [0, 1, 2, 3, 4, 0, 1, 2, 3, 4].

Both lists have a largest non-duplicate set of 5 (0, 1, 2, 3, 4), so using the uniqueness equation above, it can be seen that both lists are 50% unique (5 unique elements/10 total elements). However, from a complexity point of view, it can be seen that the uniqueness of the second set is harder to detect than the uniqueness of the first set, notwithstanding that the uniqueness is the same for both sets. For example, consider the likelihood of drawing two 0s from the first list as compared to the likelihood of drawing a pair elements from the second list, and having them match each other. The likelihood of the former result is clearly greater than the likelihood of the latter result.

Given the foregoing, and for the purposes of this disclosure, uniqueness determined based on pairs of elements may be referred to herein as 'worst case' uniqueness, and example embodiments disclosed herein may include detecting the worst case. Note that if the worst case may be determined from sampling with high probability, then cases other than the worst case may be detected with even higher probability than the worst case.

B. Circumstances Addressed by Example Embodiments

Example embodiments may embrace approaches and solutions that take account of various circumstances. Some examples are discussed below.

B.1 Determining Uniqueness of a List

Determining whether or not a list is unique can be time consuming. Even an efficient deterministic algorithm still requires reading elements of a list until a duplicate entry in the list has been found. Thus, example embodiments may provide for obtaining a high confidence in uniqueness from sampling.

B.2 Determining the Meaning of a Column

Finding the meaning of a column in conventional approaches is a human decision, rather than an automated one performed by a non-human entity. Consider, for example, a table of sales. While the transaction times column in that table, that is, the times when particular transactions took place, tend to be unique, the transaction times are not particularly descriptive of the nature of the table, and most of the time that data would not be useful as relationship between two tables. In general then, embodiments of the invention may enable a subject matter expert to use automation to find an answer at the level of specificity that the expert wants, want without requiring the expert having to code it themselves.

B.3 Combination Scaling

In general, the number of ways to pick two columns out of a set of many columns tends to scale quickly to the point that the determination of combinations becomes computationally prohibitive. Thus, example embodiments may operate to make the initial combination operation less time consuming than would be the case absent such embodiments, and may further operate to feed human and automated input back into a system to restrict expensive searches to only the most promising candidates.

C. Aspects of Some Example Embodiments

In general, some example embodiments of the invention may embrace methods for finding entirely, and mostly, unique columns, which may be referred to herein as 'primary keys,' relatively quickly. Before describing an example method, some useful insights are discussed.

First, when looking for uniqueness, there may be no need to read the entirety of a column if a subset appears as non-unique. Among other things, this approach may be more computationally efficient than checking all the entries in the column.

Second, embodiments may provide for checking a subsample of column entries of roughly the size $n^b$, where $0.5<b<1$, and 'n' (any positive integer) is the number of rows, also referred to as records or entries, in a table of a database. That is, each row of a column may have an associated value or entry. This approach provides unexpectedly high certainty that the column that has been sampled in this way is entirely unique.

Finally, embodiments may embrace an approach that enables a human to look at and see intermediate results after less computationally intensive steps so the human user can entirely discard columns or combinations that do not have semantic meaning. This means that the algorithm does not have to spend time on candidates that do not matter, that is, that lack semantic meaning.

C.1 Example method for detection of probabilistic uniqueness

Initially, this discussion begins with an explanation of how to handle a single column, or list, which may be referred to as 'L.' (1) In this approach, the user may provide a location of a list 'L' of discrete elements, possibly with duplicates. In the case of SQL (Structured Query Language) data structures, this data may not be read into memory on a local machine. The user may also provide a tolerance for how certain the user would like to be that the data is unique.

(2) Next, a small number of elements, 100 for example, may be randomly sampled from the list. If there are duplicates, the calculation may end here and return an indication that 'L' is not unique. Note that if these rows are to be used as well for later operations of the method, the method may need to store the values so that these rows can also be checked for duplicates against the new rows.

(3) Next, the user may be presented with some sample data. This can be helpful so that a subject matter expert can verify that 'L' is useful as a primary key at all. The user is given the option to end the computation here and mark this column to be ignored.

(4) Finally, the method for finding combinations of columns may randomly sample 'p' elements from all elements that were not included in the initial sample. An example function, according to some embodiments, to use to find 'p' for (1) a given sample size, and (2) a desired tolerance, is defined below as the function find_subsample_size. The use of this function may return substantially fewer than the total number of elements in a list or column, while still returning enough elements to enable a determination that there is a relatively high probability that the column is unique.

C.2 Example Method for Finding Combinations of Columns

Consider a table for which it is desired to find a primary key, that is, a unique column, or a primary key constructed out of multiple columns, for that table. An example method for finding a combination of columns that may be used to determine a primary key may proceed as set forth below.

(1) Initially, let j=1 be the number of columns to construct a primary key from. It may be preferable, in some cases at least, to have primary keys made out of the fewest possible columns, but the method may increment 'j' on the last operation here. Set C as the columns to select from and initialize it as all columns in the table. Note that one or more columns may be removed from the total 'C' with each iteration of the method. Further, obtain, possibly from a user, the desired tolerance for certainty about uniqueness.

Next, (2) find all sets of j columns from C.

Then, (3) for each set, run a method for detection of probabilistic uniqueness, such as the method set forth in C.1 above. For efficiency purposes, it may be worthwhile to only compute the combination of elements for each subsample, instead of all the values in that column, since there are ways to avoid larger computations in that method. If users mark columns to be ignored, remove those columns from the set 'C.'

Finally, (4) if no primary keys are found, set j=j+1 and repeat (2) and (3) as set forth above. The method may thus continue, that is, iterate, until one or more primary keys are identified.

C.3 Example Method for Estimating Subsample Size

As noted elsewhere herein, example embodiments of the invention may comprise taking a subsample from a list to build certainty that the list is completely unique. Because the progression may increase sub-linearly in the number of elements, embodiments may quickly build a table to estimate the required sample size based on information about the underlying data. Following are disclosed aspects of an example method for estimating a subsample size needed to support a specified uniqueness.

(1) Set the expected uniqueness of the underlying data so that it is possible to find the required sample size to have a given level of certainty that a duplicate will be found. For example, a uniqueness of 95% may be adequate in some applications, and can be specified by a user.

Next, (2) set the desired tolerance for confidence that a duplicate would have been seen if it existed. For example, the desired tolerance for confidence may be set at 99%. That is, in this illustrative example, the user is saying, in effect, that the user wants to be 99% sure that the user would have found a duplicate if the underlying data is 95% unique".

(3) For several numbers such as, for example, $x_1=1024$ and $x_2=2048$, create a list that is worst-case unique at the proposed uniqueness out of integers.

Then, (4) sample an incrementing number of elements a large number of times, such as 1000 for example, and count how often duplicates are detected. Find the number y so that sampling y elements detects duplicates more often than the tolerance set in (2) above. Then, pair each y with the population size it came from $x_i$, and call it $y_i$.

Finally, (5) fit the results to a curve of the form $ax^b$. If values $(x_1, y_1)$ and $(x_2, y_2)$ have been found, then solve for a and b with:

$$b=(\log(y_2/y_1))/(\log(x_2/x_1))$$

and $a=y_1/x_1^b$. The method may average several values of a and b, or may choose only one.

With reference now to the graph 100 disclosed in FIG. 1, example embodiments of the invention may apply a function of the form $ax^b$, where b=0.53, to obtain a good overestimate of experimental results. An approximation, obtained using the aforementioned function, is shown in the upper curve, and experimental results in the lower curve. The sample size needed is shown on the Y-axis, and the population size, that is, the number of entries in a column or list of interest that is being sampled, is shown on the X-axis.

As shown, the projected sample size obtained using the function tracks fairly closely with the number of samples experimentally determined to be needed to obtain the desired results. Note that the projected sample size actually overestimates the number of samples actually needed and, as a result, assurance may be had that the projected sample size will be adequate to meet the specified parameters of certainty (confidence) and uniqueness. On the other hand, an underestimate of the number of samples needed may not necessarily meet the specified parameters. Put another way, in this example, the projected sample size errs on the safe side.

In more detail, the function $ax^b$ may be referred to as find_subsample_size, where a and b may be pre-defined for a target tolerance. The values in Table 1 below were found experimentally from running with $x_i$ up to 32,768, but an embodiment could also take the same value a=14 and b=0.6 and still only have to check many fewer rows. That is, an embodiment could take a fixed function like 14x^0.6 which would still be substantially less than x when x is large.

Particularly, below are the observed numbers when sampling, by an example embodiment, from an example dataset that is 90%, 95%, and 99%, unique for a curve that will overestimate the sample size required for a 95%, 99%, and 99.9%, tolerance of certainty that a duplicate will be detected.

|  | 90% unique | 95% unique | 99% unique |
| --- | --- | --- | --- |
| Tolerance of 95% | $4.88x^{0.52}$ | $7.40x^{0.51}$ | $13.46x^{0.54}$ |
| Tolerance of 99% | $5.82x^{0.53}$ | $7.85x^{0.53}$ | $15.95x^{0.54}$ |
| Tolerance of 99.9% | $13.85x^{0.51}$ | $8.73x^{0.54}$ | $13.53x^{0.58}$ |

Figure 2:
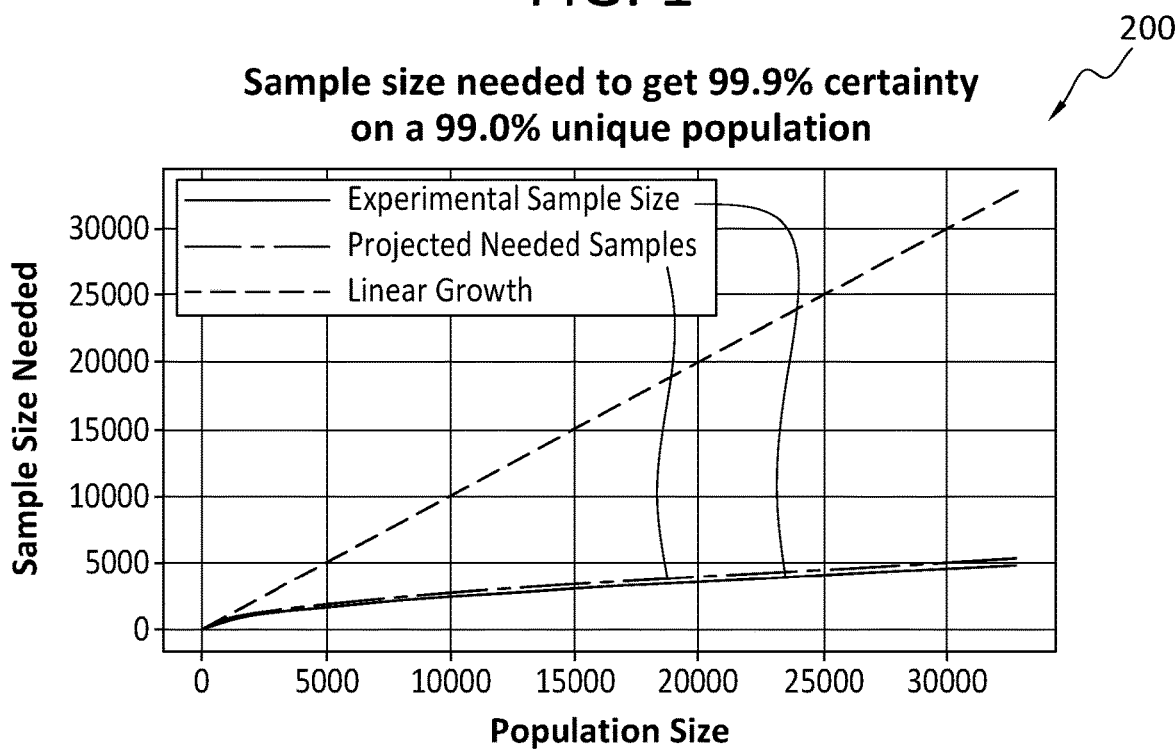
FIG. 2 discloses the behavior of experimental results relative to a linear relation between population size and sample size.

As shown in the graph 200 disclosed in FIG. 2, both the projected sample size (top curve) and experimental sample size (bottom curve) are much smaller than linear, and grow favorably as the population grows. Put another way, the projected sample size and experimental sample size are both relatively less sensitive to population size increases, as compared with a straight linear relation between population size and required sample size. This property may be referred to herein as sub-linearity, and this sub-linearity of the projected sample size and experimental sample size may be particularly beneficial, such as in terms of computational resources required, as the population increases in size.

It is also noted, with continued reference to FIG. 2, that in cases where x is sufficiently small, there may be no need to subsample because the entire column may be checked relatively quickly. Thus, embodiments of the invention may provide for a relatively well-behaved curve of the required sample size that increases relatively slowly as compared with a linear approach.

D. Further Discussion

As disclosed herein, example embodiments may possess a variety of useful aspects and features. For example, embodiments may include a method to quickly determine, with high probability, whether a list of data contains duplicates. As another example, embodiments may provide an automated way for a user to quickly estimate whether a column or set of columns is unique, up to a certain threshold. An embodiment may provide an interactive method for removing columns from consideration as a primary key. In this regard, while a subject matter expert might not know which columns or column combinations are good candidates for being considered as functioning as primary keys, they subject matter expert may be able to know, with a high degree of certainty, which column(s) is/are not good candidates for being considered as a primary key. Because embodiments of the invention may perform a subsample process, embodiments may provide an opportunity to ask the user about the validity of identified candidates, presented based on uniqueness. As a final example of useful features and aspects of some embodiments, one or more embodiments may provide a method for estimating a required size of a sample for determining, with high accuracy, whether the list has duplicates. A byproduct of this is a method to estimate the required sample size, given a user preference for certainty. An illustrative table (Table 1) has been disclosed herein, but similar tables could be pre-computed for a different need using the example method disclosed herein at C.3.

Finally, it is noted that embodiments of the invention may be particularly useful, for example, in the management of data contained in a data warehouse or a data lake where it can be prohibitively computationally expensive. Within those data sources, there are tables with billions of rows. It is prohibitively computationally expensive to try to check for primary keys out of all combinations of columns without employing the methods disclosed herein. Sampling operations of embodiments of the invention may be implemented using PostgreSQL 9.5, which can perform very fast sampling. Various other generic SQL methods of sampling randomly may be employed which, while not as fast as PostgreSQL 9.5, may still sample data, guided by embodiments of the invention, much faster than reading every row.

Thus, the disclosed methods may finish more quickly than a check for complete uniqueness.

E. Example Methods

Figure 3A:
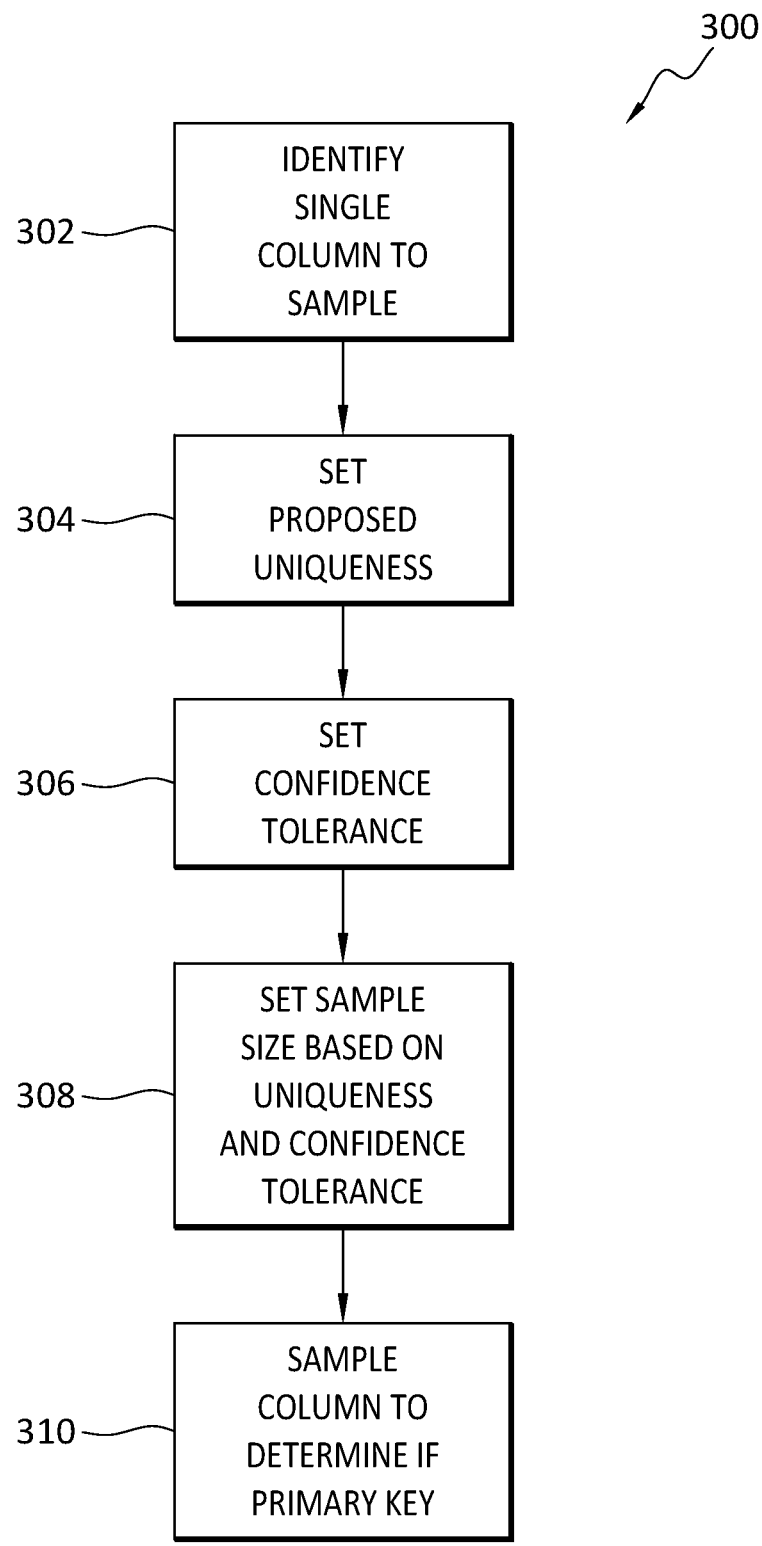
FIG. 3a discloses an example method for using a single column to determine a sample size and a primary key.

It is noted with respect to the disclosed methods, including the example method of FIG. 3a, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E.1 Single Column Approach

Directing attention now to FIG. 3a, an example method 300 according to some embodiments is disclosed. The method 300 may begin with the identification 302 of a single column, possibly by a user or a computing entity, for sampling. Next, a proposed uniqueness, or uniqueness threshold, may be set 304. The uniqueness may indicate an extent to which a user requires that that the data in the identified column 302 be unique. The uniqueness set 304 may be user-specified, a default value, or computer-selected. A confidence tolerance may also be set 306 that may indicate, for example, the confidence required by the user in the uniqueness of the entries in the selected column. Note that the proposed uniqueness and confidence tolerance may be set in an order that is the reverse of that indicated in FIG. 3a. That is, the confidence tolerance may be set prior to the setting of the proposed uniqueness. Like the uniqueness, the confidence tolerance may, for example, be user-specified, a default value, or computer-selected. It is noted that a single column may, in some embodiments, comprise a concatenation of multiple columns. For example, an embodiment may transform 'j' columns into a single column by string concatenation, and that single column thus created may be employed as the single column in the example method 300.

After the confidence tolerance and the proposed uniqueness have been set, an estimated sample size, which may also be referred to herein as a 'subsample' size as it may consist of only a portion, that is, less than all, of the entries in the selected column, may then be determined 308 based on those parameters. The selected column may then be sampled 310 to determine if that column is adequate to serve as a primary key for the table that includes that column. If so, then the table may be associated with a description that is consistent with the primary key. If not, the method 300 may be repeated with a different column, beginning with selection 302 of the different column.

E.2 Combined Columns Approach

Figure 3B:
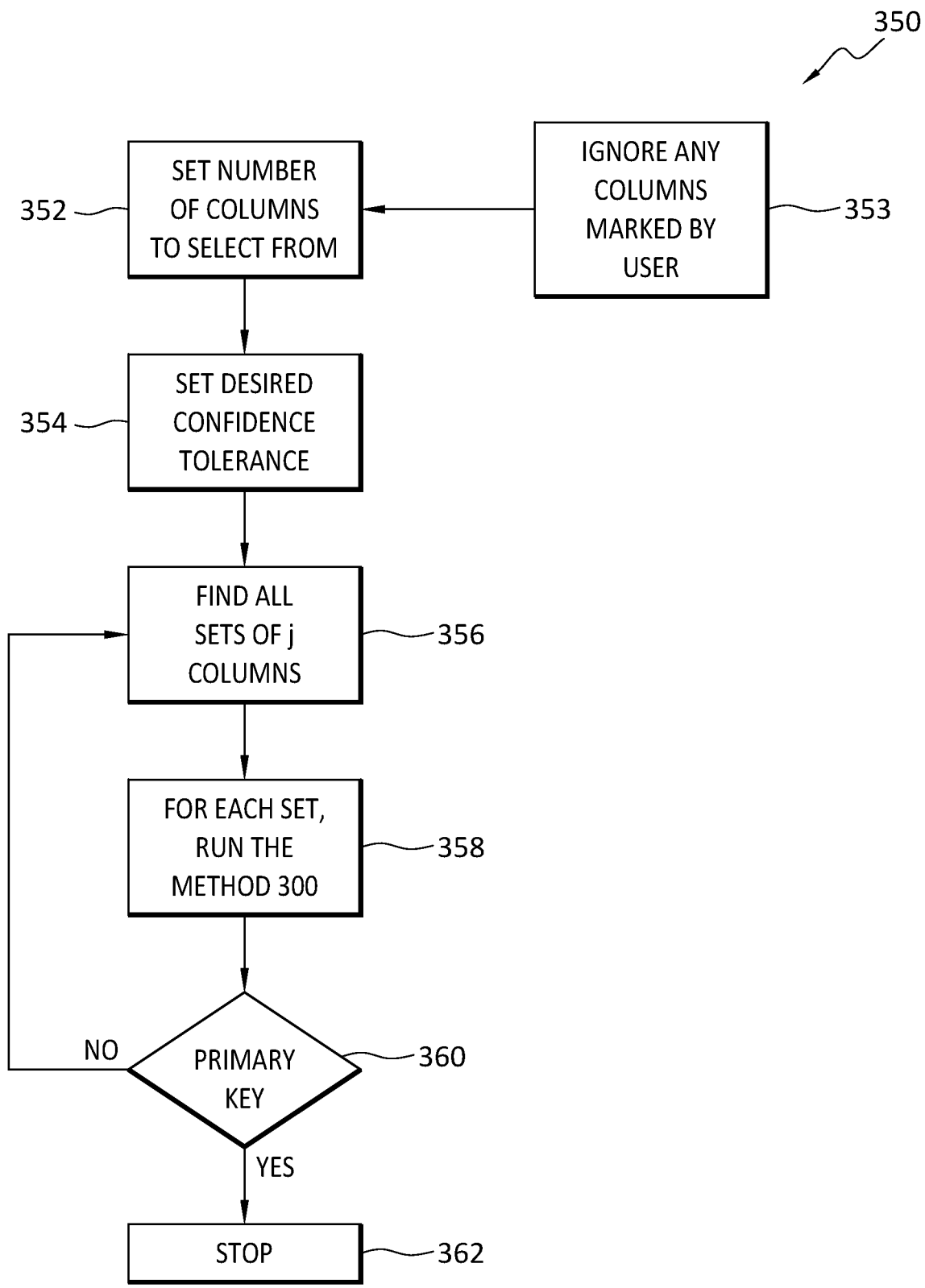
FIG. 3b discloses an example method for using multiple columns to determine a sample size and a primary key.

In contrast with the method 300, the example method 350 disclosed in FIG. 3b may operate to identify and/or construct a primary key using multiple columns of a table that includes a total of 'C' columns.

Initially, the number of columns to be considered may be set 352 as 'C.' Note that a user may identify one or more columns that can be ignored. Thus, the number of columns that is set 352 may ignore 353 any such columns identified by the user.

Next, a desired confidence tolerance may be set 354. Then, all sets of 'j' columns may be found 356. Note that 'j' may initially be set as 1, and subsequently incremented (by +1) one or more times if necessary.

For each set identified at 356, the method 300 disclosed in FIG. 3a may be performed 358. Each time the method 300 is performed 358, a check 360 may be performed to determine if the column, or columns, constitute a primary key. If not, the method 350 may return to 356, and 'j' incremented upward by '1,' that is, +1. On the other hand, if the check 360 reveals that a primary key has been identified, the method 350 may terminate at 362.

F. Further Example Embodiments

Following are some further example embodiments of the invention. These are presented only by way of example and are not intended to limit the scope of the invention in any way.

Embodiment 1. A method, comprising: identifying a column of a table, and the column includes multiple entries; setting a proposed uniqueness for the column; setting a confidence tolerance for the proposed uniqueness; estimating a sub-sample size for the column based on the proposed uniqueness and the confidence tolerance; based on the sub-sample size, sampling a subset of the entries in the column; and based on the sampling, determining whether or not the column is a primary key for the table.

Embodiment 2. The method as recited in embodiment 1, wherein the subset has a size of $n^b$, where $0.5<b<1$, and wherein 'n' is the total number of entries in the column.

Embodiment 3. The method as recited in any of embodiments 1-2, wherein the determining is performed without reading all of the entries in the column, and wherein the column comprises a concatenation of 'j' columns.

Embodiment 4. The method as recited in any of embodiments 1-3, further comprising: setting a number of columns included in a set, and the columns include the identified column; for each column in the number of columns, except the identified column, setting a desired confidence tolerance; finding all sets of 'j' columns in the set; and for each column in the number of columns, except the identified column, performing the operations of embodiment 1 until a primary key is identified.

Embodiment 5. The method as recited in embodiment 4, wherein 'j' is incremented by 1 each time that the primary key is not identified.

Embodiment 6. The method as recited in embodiment 4, wherein the identified primary key is constructed from multiple columns of the set.

Embodiment 7. The method as recited in embodiment 4, wherein the set initially includes all of the columns in the table, less any column(s) that a user has marked to be ignored.

Embodiment 8. The method as recited in any of embodiments 1-7, wherein estimating the sub-sample size comprises: sampling an incrementing number of entries of the column; counting a number of times that duplicate entries are detected; finding a number 'y' such that sampling 'y' entries detects duplicates more often than the confidence tolerance; and pairing each 'y' entry with a population size 'x' of entries from which the 'y' entry came.

Embodiment 9. The method as recited in embodiment 8, further comprising fitting the 'x' and 'y' values to a curve of form ax^B.

Embodiment 10. The method as recited in embodiment 9, further comprising solving for 'a' and 'b' using the following relationships: $b=(\log (y_2/y_1))/(\log (x_2/x_1))$; and $a=y_1/x_1^b$.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
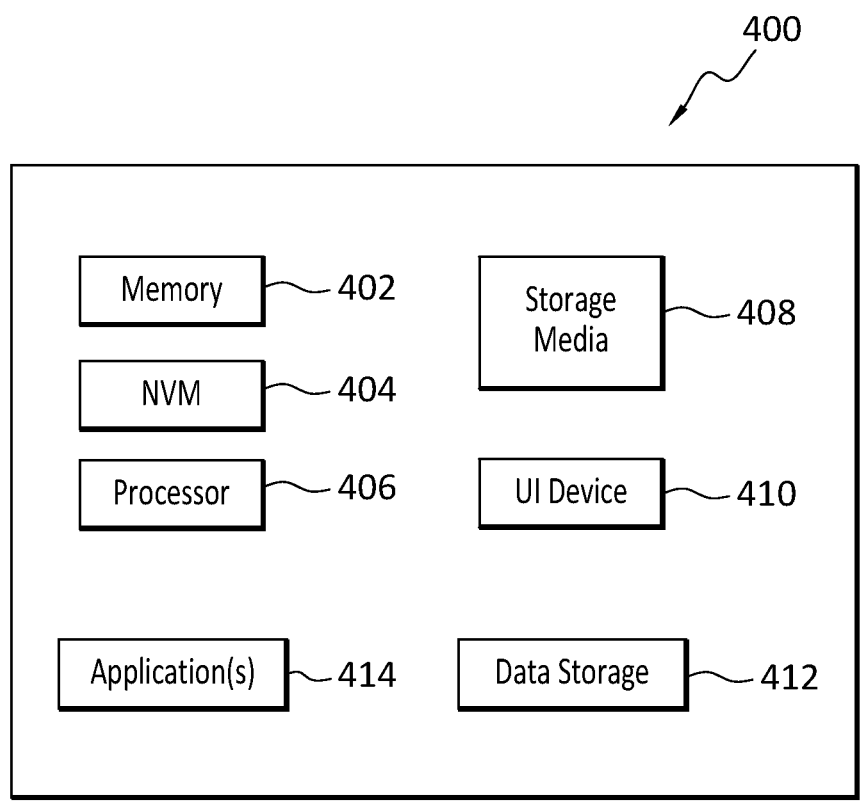
FIG. 4 discloses an example computing entity operable to perform any of the claimed methods, processes, and operations.

With reference briefly now to FIG. 4, any one or more of the entities disclosed, or implied, by FIGS. 1-3b and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI (user interface) device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a column of a table stored in a database, and the column includes multiple entries;
   setting a proposed uniqueness for the column;
   setting a confidence tolerance for the proposed uniqueness;
   estimating a sub-sample size for the column based on the proposed uniqueness and the confidence tolerance;
   based on the sub-sample size, sampling a subset of the entries in the column; and
   based on the sampling, determining whether or not the column is a primary key for the table stored in the database,
   wherein the subset has a size of n^b, where 0.5<b<1, and wherein 'n' is a total number of entries in the column.

2. A method, comprising:
   identifying a column of a table stored in a database, and the column includes multiple entries;
   setting a proposed uniqueness for the column;
   setting a confidence tolerance for the proposed uniqueness;
   estimating a sub-sample size for the column based on the proposed uniqueness and the confidence tolerance;
   based on the sub-sample size, sampling a subset of the entries in the column; and
   based on the sampling, determining whether or not the column is a primary key for the table stored in the database,
   wherein the determining is performed without reading all of the entries in the column and wherein the column comprises a concatenation of 'j' columns.

3. The method as recited in claim 1, further comprising:
   setting a number of columns included in a set, and the columns include the identified column;
   for each column in the number of columns, except the identified column, setting a desired confidence tolerance;
   finding all sets of 'j' columns in the set; and
   for each column in the number of columns, except the identified column, performing the method of claim 1 until a primary key is identified.

4. The method as recited in claim 3, wherein 'j' is incremented by 1 each time that the primary key is not identified.

5. The method as recited in claim 3, wherein the identified primary key is constructed from multiple columns of the set.

6. The method as recited in claim 3, wherein the set initially includes all of the columns in the table stored in the database, less any colunnn(s) that a user has marked to be ignored.

7. The method as recited in claim 1, wherein estimating the sub-sample size comprises:
   sampling an incrementing number of entries of the column;
   counting a number of times that duplicate entries are detected;
   finding a number 'y' such that sampling 'y' entries detects duplicates more often than the confidence tolerance; and
   pairing each 'y' entry with a population size 'x' of entries from which the 'y' entry came.

8. The method as recited in claim 7, further comprising fitting the 'x' and 'y' values to a curve of form ax^b.

9. The method as recited in claim 8, further comprising solving for 'a' and 'b' using the following relationships:

$$b = (\log(y_2/y_1))/(\log(x_2/x_1))$$

and $a = y_1/x_1^b$.

10. A non-tra nsitory storage medium having stored therein instructions that are executable by one or more hardware processors to perform operations comprising:
    identifying a column of a table stored in a database, and the column includes multiple entries;
    setting a proposed uniqueness for the column;
    setting a confidence tolerance for the proposed uniqueness;
    estimating a sub-sample size for the column based on the proposed uniqueness and the confidence tolerance;
    based on the sub-sample size, sampling a subset of the entries in the column; and
    based on the sampling, determining whether or not the column is a primary key for the table stored in the database,
    wherein the subset has a size of n^b, where 0.5<b<1, and wherein 'n' is a total number of entries in the column.

11. The non-transitory storage medium as recited in claim 10, wherein the determining is performed without reading all of the entries in the column and wherein the column comprises a concatenation of 'j' columns.

12. The non-transitory storage medium as recited in claim 10, wherein the operations further comprise:
    setting a number of columns included in a set, and the columns include the identified column;
    for each column in the number of columns, except the identified column, setting a desired confidence tolerance;
    finding all sets of 'j' columns in the set; and
    for each column in the number of columns, except the identified column, performing the method of claim 11 until a primary key is identified.

13. The non-transitory storage medium as recited in claim 12, wherein 'j' is incremented by 1 each time that the primary key is not identified.

14. The non-transitory storage medium as recited in claim 12, wherein the identified primary key is constructed from multiple columns of the set.

15. The non-transitory storage medium as recited in claim 12, wherein the set initially includes all of the columns in the table stored in the database, less any colunnn(s) that a user has marked to be ignored.

16. The non-transitory storage medium as recited in claim 10, wherein estimating the sub-sample size comprises:
    sampling an incrementing number of entries of the column;
    counting a number of times that duplicate entries are detected;
    finding a number 'y' such that sampling 'y' entries detects duplicates more often than the confidence tolerance; and
    pairing each 'y' entry with a population size 'x' of entries from which the 'y' entry came.

17. The non-transitory storage medium as recited in claim 16, wherein the operations further comprise fitting the 'x' and 'y' values to a curve of form ax^b.

18. The non-transitory storage medium as recited in claim 17, wherein the operations further comprise solving for 'a' and 'b' using the following relationships:

$$b = (\log(y_2/y_1))/(\log(x_2/x_1))$$

and $a = y_1/x_1^b$.

* * * * *